Oct. 25, 1949.　　　F. J. EICHELMAN　　　2,486,011
VALVE

Filed April 30, 1946

FLUID OUTLET　　　FLUID INLET

INVENTOR
*Frank J. Eichelman*
BY
*Dean, Fairbanks & Hirsch*
ATTORNEYS

Patented Oct. 25, 1949

2,486,011

UNITED STATES PATENT OFFICE 2,486,011

VALVE

Frank J. Eichelman, Oak Park, Ill., assignor to National Cylinder Gas Company, Chicago, Ill., a corporation of Delaware Application April 30, 1946, Serial No. 666,096

6 Claims. (Cl. 287—53)

This invention relates to that type of valve in which there is provided a valve stem threaded in the valve casing for rotational and endwise movement, and carrying at its inner end a valve member movable axially in respect to the seat in the casing. It relates more particularly to the construction of the valve stem and an operating handwheel secured thereto to move endwise therewith and locked against relative rotation in respect thereto.

The main objects of the invention are to provide an effective locking means which may be made by simple machining operation, which may be easily and quickly assembled or taken apart, which is concealed and protected within the handwheel.

In carrying out my invention, I provide a handwheel which may be slipped onto the end of the stem, and provide the handwheel and the stem with registering slots open at the top and into which the locking key may be deposited. There is also provided a cap or top plate threaded into the stem above the handwheel to conceal the slots and locking key to hold the locking key in place, to hold the handwheel against axial movement with respect to the stem, and, in effect, form a part of the handwheel itself.

Figure 1:
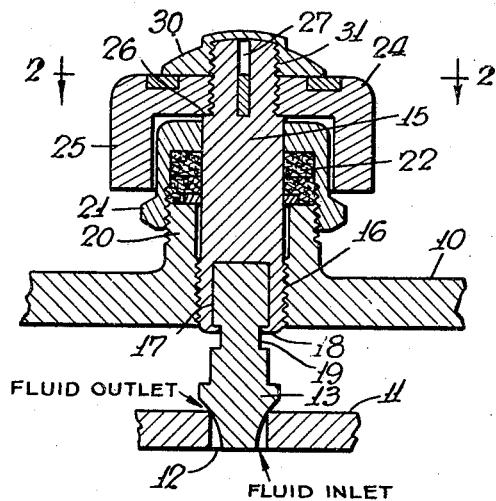
Figure 2:
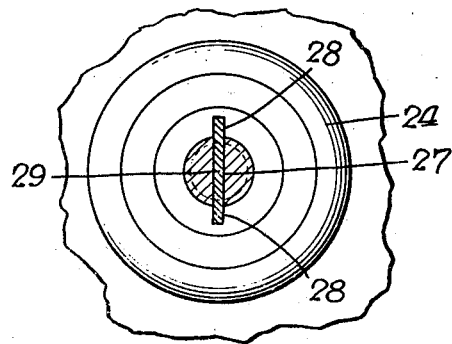

One embodiment of my invention is illustrated in the accompanying drawings, in which Fig. 1 is a central longitudinal section through the valve embodying the invention and taken axially of the valve stem; and Fig. 2 is a transverse section of the line 2—2 of Fig. 1.

As the present invention does not embody any novel features of the valve casing per se, and as the valve casing may be of various types and forms, there is shown in the drawings only a portion of a valve casing, including a wall 10, in which the valve stem is mounted, and a wall 11 having a port 12 to be controlled by the valve, and presenting a valve seat for a valve member 13, which may be of the needle type valve, or of any other suitable form adapted to move axially toward and from the valve seat.

In the construction illustrated there is provided a valve stem 15 having external threads 16 engaging corresponding threads in a bore or passage through the wall 10, and carrying a valve 13 held against endwise movement in respect thereto, and preferably free for relative rotation in respect thereto. As shown, the stem has a cylindrical chamber or recess 17 at its inner end, and receiving a cylindrical end portion of the valve 13. The iner end of the stem preferably terminates in a thin edge or flange portion 18 which may be spun over into an annular groove 19 on the valve 13, so as to engage a shoulder at the end of the groove and hold the valve member in the stem, but permit of the rotation of the stem in respect to the valve member. Other types of valve members may be used in place of that shown.

The wall 10 of the casing has an upstanding annular flange 20 around the threaded bore which receives the stem, and this is externally threaded to receive a gland 21 enclosing a packing 22 around the valve stem. The inner end of the chamber within the gland 21 is preferably bevelled or conical so that, as the gland is screwed down on the flange 20, the packing is compressed and at the same time forced inwardly against the valve stem. The packing is preferably of the split type.

The rotation of the valve stem to impart endwise movement thereto, is effected by means of a handwheel 24 which is locked to the outer end of the valve stem, and preferably has a flange or skirt portion 25 encircling the gland 21 and presenting a comparatively wide peripheral surface, whereby the handwheel may be effectively gripped to rotate it.

As an important feature of the invention, the stem 15 is provided with a shoulder 26 upon which the handwheel sits, and the outer end portion beyond said shoulder is threaded and provided with the transverse slot 27 extending in from the end to approximately the plane of said shoulder. The handwheel has a hole therethrough so that it may be slipped onto the end of the stem and seat on said shoulder, and also has a pair of recesses or slots 28 extending outwardly at diametrically opposite sides of the hole and which may be aligned with the slot 27 in the stem to receive a key member 29. This key member is preferably a flat bar which has a length greater than the diameter of the stem, width approximately equal to the thickness of the top transverse wall of the handwheel, and such thickness as to substantially fit the slots 27 and 28. With the slot of the stem and the slots or recesses of the handwheel in aligned positions, the key member is dropped or forced into aligned slots so as to positively lock the handwheel against rotation in respect to the stem.

The stem extends out to some distance beyond the outer surface of the handwheel, and a cap or plate 30 having a threaded socket 31 is screwed onto the end of the stem to engage the handwheel and cover the slot 27. This cap or plate has a diameter greater than the length of the keyway so that it completely covers and conceals the slot 28 and the key member 29.

Preferably the hole through the handwheel is not threaded so that it merely slips onto the stud, and whenever it is desired to remove the handwheel, as for instance to tighten the gland 21, or to replace the packing 22, it is merely necessary to unscrew the cover plate or nut 30 and lift off the handwheel. In some construction the handwheel may be threaded onto the stem and then locked by the key members so that the shoulder 26 is unnecessary.

If the valve member becomes worn or corroded and requires replacement, the handwheel, gland, packing and stem may be readily removed, the handwheel and stem taken apart, and a new valve stem and valve substituted. No tools are required other than a wrench for unscrewing the plate 30 and the gland 21.

In some constructions it is not necessary that the slot 27 extend all of the way across the diameter of the stem 15. One of the slots 28 may be omitted and the key 29 and be dropped into the other slot 28 and a groove or kerf constituting one end portion of the slot 27. The cap or plate 30 may be in the form of an ordinary nut.

In valves of the general type here involved, the stem and handwheel are usually fastened together with a pin driven into a bolt which is drilled partly into the handwheel and partly into the stem. Once this pin is driven in, it is difficult if not almost impossible to remove it without damage to the handwheel. Thus, if the valve seat or other parts become worn, it is necessary to replace not only the stem but also the handwheel. In the present construction, it is possible to replace merely the stem, as the stem and handwheel may be easily taken apart.

Having thus described my invention, what I claim as new and desire to secure by Letters Patent is:

1. In combination a rotatable stem having an axially facing shoulder and a transverse slot extending inwardly from one end approximately to the transverse plane of said shoulder, a handle member having an opening therethrough to receive the end of said stem and abut said shoulder, and said opening having a slot extending radially therefrom, a key member disposed in the aligned slots of said stem and said handle member to prevent relative rotational movement of said handle member and stem, and a cap threaded onto the outer end of said stem, concealing said slots and key member, and holding said handle member against said shoulder.

2. In combination a rotatable stem having a slot open at one end and along one side of said stem, a handle member having an opening therethrough to receive the end of said stem, said opening having a slot extending radially therefrom, a key member disposed in the aligned slots of said stem and said handle member to prevent relative rotational movement of said handle member and stem and readily removable through the end of said stem, and a cap threaded onto the outer end of said stem, concealing said slots and key member, and holding said handle member against said shoulder.

3. A valve having a rotatable stem having a transverse slot extending inwardly from the outer end thereof, a handle member having an opening therethrough to receive the outer end of said stem, and having a slot on the side of said opening to register with the slot in said stem, a removable key member disposed in the slot of said stem and extending into the slot of said handle member, and a cap on the outer end of said stem for holding said handle member in engagement with said shoulder, retaining said key member in place, and covering said key member, slots and the outer end of said stem.

4. A valve having a rotatable stem having an external shoulder spaced from and facing toward the outer end of said stem, and a transverse slot extending from the outer end of the stem to approximately the plane of said shoulder, a handle member having an opening therethrough and adapted to slip onto the outer end of said stem and seat on said shoulder, and having a slot on the side of said opening to register with the slot in said stem, a transversely extending key member disposed in the slot of said stem, extending into the slot of said handle member, and readily removable through the outer end of the stem, and a cap threaded onto the outer end of said stem for holding said handle member in engagement with said shoulder, covering said key member and slots, retaining said key member in place, and covering the outer end of said stem.

5. In a valve, the combination of a rotatable stem having a transverse slot therethrough extending in from the outer end thereof, a handle member having an opening therethrough to receive the outer end of said stem, and having a recess on the side of said opening, a locking pin disposed in and freely removable from the slot of said stem and having an end disposed in said recess, and a nut threaded on the outer end of said stem for retaining said locking pin in position.

6. In a valve, the combination of a stem having a transverse slot therethrough extending in from the outer end thereof, a shoulder on the exterior substantially in the plane of the inner end of said slot, a handle member having an opening therethrough to receive the outer end of said stem, and seating on said last mentioned shoulder, and having recesses on opposite sides of said opening, a locking pin disposed in the slot of said stem and having its ends disposed in said recesses, and a nut on the outer end of said stem for holding said handle member on said seat, for covering the outer end of said stem, and for concealing and retaining said locking pin in position.

FRANK J. EICHELMAN.

REFERENCES CITED

The following references are of record in the file of this patent:

UNITED STATES PATENTS

| Number | Name | Date |
| --- | --- | --- |
| 1,495,733 | Gillen | May 27, 1924 |
| 1,763,927 | Ireland | June 17, 1930 |
| 1,832,554 | Holstein | Nov. 17, 1931 |
| 2,233,962 | Rover | Mar. 4, 1941 |